United States Patent Office 2,777,008
Patented Jan. 8, 1957

2,777,008

MANUFACTURE OF RUBBER VULCANIZATES CONTAINING FILLER AND POLYETHYLENE GLYCOL ETHERS

Rudolf Kern, Neustadt (Haardt), and Willy Lautsch, Berlin-Dahlem, Germany, assignors to Rhein-Chemie G. m. b. H., Heidelberg, Germany, a corporation of Germany No Drawing. Application June 13, 1951,
Serial No. 231,426

5 Claims. (Cl. 260—761)

This invention relates to a process for the manufacture of rubber vulcanizates.

The primary object of our invention is to generally improve the vulcanizates referred to, and other objects of this invention will become apparent from the following description.

According to our present invention, we use non-ionic agents to be added to rubber or vulcanizable synthetic plastic compositions. Our addition agents bear at least one hydrophobic radical $R_1$, and at least one hydrophilic radical $R_2$ and/or at least one hydrophobic radical $R_3$, $R_2$ and/or $R_3$ being linked to $R_1$ over an oxygen atom. The oxygen atom may originate, for instance, from a hydroxyl, carboxyl or sulfonic group.

Examples of the hydrophobic radical $R_1$ are a normal, iso-alkyl, alkylphenyl, monoalkyl or polyalkyl aromatic hydrocarbon radical, and their hydrogenated derivatives, such as resin alcohols. If $R_1$ is of an aliphatic structure, it may consist of a fatty acid radical of natural saturated or unsaturated fatty acids, of fatty acids obtained by oxidation of paraffin, or of the corresponding alcohols.

The hydrophilic radical $R_2$ may be formed by polyglycol ether radicals, monoxy alcohols or polyoxy alcohols, such as, for example, polyvinyl alcohol radicals and sugar alcohol radicals.

The hydrophobic radical $R_3$ derives from aliphatic or aromatic alcohols of any chain length.

The addition agents of our invention may have the structure of esters or ethers when the hydrophobic radical $R_1$ is linked to the hydrophilic radical $R_2$ by means of an oxygen bridge.

Among the addition agents suitable for the process of this invention, the following compounds were found to be particularly advantageous, but it is to be understood that these are enumerated as examples only without limiting the invention to these examples:

Polyglycol esters of fatty acids, resin acids, naphthenic acids, or of acids obtained by oxidation of paraffin; polyglycol ethers of fatty alcohols, alkyl phenols or naphthols; esters of aromatic sulfonic acids formed with monovalent polymolecular alcohols; butyl, isooctyl or other alcohol esters of the above mentioned carboxylic or sulfonic acids; fatty acid monoglycerides; esters of the above mentioned carboxylic and sulfonic acids with polyalcohols, such as pentaerythritite, sugar alcohols, polyvinyl alcohols, etc.

Our addition agents bring about a substantial improvement of the mechanical properties, especially as far as tensile strength and tear and cut growth resistance of synthetic plastic and rubber compositions are concerned. This is particularly true in the case of compositions containing white or light-colored fillers, such as magnesium oxide, alumina gel, kieselguhr, siliceous chalk, silica gel, calcium silicate, aluminum silicate, active zinc oxide, etc., and mixtures of these fillers with each other and with other fillers, such as carbon black.

The non-ionic agents of our invention when added to rubber or plastic compositions have a strong dispersing action on the fillers which facilitates mixing and, therefore, reduces the amount of energy necessary in the masticating or milling operation.

The working of the rubber or synthetic plastic compositions is further facilitated by adding our addition agents together with water. The water may be added either as such or in form of aqueous solutions or emulsions of the addition agents.

The presence of water, even with higher filler contents, produces, a transparency which reaches a maximum at a water concentration which depends on the formulation of the composition and especially the kind and quantity of the filler used.

The non-ionic agents of the invention may also be used in mixtures with each other or in combination with other dispersing agents or other auxiliary materials, softeners, etc.

The quantity of the non-ionic agents to be added to the rubber or plastic compositions according to the process of our invention varies within wide limits. It will depend on the kind and composition of the agent, for instance, the degree of oxyethylation, as well as the kind, quantity and hydrophilic properties of the filler which is to be added to the rubber or synthetic plastic composition. It will further depend on the desired physical or technical properties of the rubber vulcanizate or synthetic plastic composition to be prepared with the addition of the non-ionic agents. It is preferable to select the addition agents in accordance with the filler used and to add the addition agents in a quantity which will impart optimum properties to the synthetic plastic material or rubber vulcanizate.

From the examples given below it will be seen that the addition agents in many cases multiply the mechanical strength ascertained in parallel experiments not using the addition agents of the invention. It will be clear that the following examples are intended to illustrate the method of the invention but do not limit its scope.

Example 1

A rubber compound was made up from:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Abietic acid polyglycol ester | 3.6 |

The addition agent was produced by reacting one mol of abietic acid with six mols of ethylene oxide.

After vulcanization at 45 p. s. i. gauge pressure for 45 minutes, the vulcanizate showed the following test results, as compared with those of a vulcanizate prepared without the addition agent:

| | | |
|---|---|---|
| Tensile strength, kg./sq. cm | 146 | 118 |
| Elongation, percent | 503 | 473 |
| Young's modulus at: | | |
| 300%, kg./sq. cm | 61 | 56 |
| 500%, kg./sq. cm | 146 | |
| Tear resistance, kg./cm | 16 | 5.5 |
| Cut growth resistance, kg./cm | 40 | 23 |
| Shore hardness | 55 | 55 |
| Shock elasticity, percent | 63 | 65 |

Example 2

A rubber compound was prepared from:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Hexylheptyl-naphthol-polyglycol ether with 8 mols ethylene oxide | 3.6 |

After vulcanization at 45 p. s. i. gauge pressure for 10 minutes, the following test results were obtained, as compared with those of a vulcanizate of the same composition but not containing the addition agent:

| | | |
|---|---|---|
| Tensile strength, kg./sq. cm | 184 | 115 |
| Elongation, percent | 510 | 440 |
| Young's modulus at: | | |
| 300%, kg./sq. cm | 63 | 56 |
| 500%, kg./sq. cm | 160 | |
| Tear resistance, kg./cm | 20 | 5.3 |
| Cut growth resistance, kg./cm | 46 | 17 |
| Shore hardness | 58 | 55 |
| Shock elasticity, percent | 70 | 65 |

Example 3

A rubber compound was prepared from:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Butylphenol-polyglycol ether synthetized by oxyethylation of 1 mol butylphenol with 10–15 mols of ethylene oxide | 3.6 |

After vulcanization for 10 minutes at 45 p. s. i. gauge pressure, the following test results were obtained, as compared with those of a vulcanizate not containing the addition agent:

| | | |
|---|---|---|
| Tensile strength, kg./sq. cm | 160 | 115 |
| Elongation, percent | 500 | 440 |
| Young's modulus at: | | |
| 300%, kg./sq. cm | 64 | 56 |
| 500%, kg./sq. cm | 157 | |
| Tear resistance, kg./cm | 16 | 5.3 |
| Cut growth resistance, kg./cm | 47 | 17 |
| Shore hardness | 56 | 55 |
| Shock elasticity, percent | 69 | 65 |

In the Examples 4 and 5 below, the influence of the degree of the oxyethylation of butylphenol-polyglycol-ether on the properties of a rubber vulcanizate prepared with this addition agent is illustrated.

Example 4

A rubber compound was prepared from:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Butylphenol-polyglycol ether made by oxyethylation of 1 mol butylphenol with 4–5 mols ethylene oxide | 3.6 |

The following test results were obtained after vulcanization at 45 p. s. i. gauge pressure for 30 minutes, as compared with those given by a vulcanizate prepared without the addition agent:

| | | |
|---|---|---|
| Tensile strength, kg./sq. cm | 135 | 121 |
| Elongation, percent | 443 | 463 |
| Young's modulus at 300%, kg./sq. cm | 68 | 59 |
| Tear resistance, kg./cm | 16 | 5.8 |
| Cut growth resistance, kg./cm | 39 | 22 |
| Shore hardness | 58 | 56 |
| Shock elasticity, percent | 68 | 65 |

Example 5

A rubber compound was prepared consisting of:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Butylphenol-polyglycol ether made by oxyethylation of 1 mol butylphenol with 6–7 mols ethylene oxide | 3.6 |

After vulcanization at 45 p. s. i. gauge pressure for 20 minutes, the following test results were obtained, as compared with those given by a vulcanizate not containing the addition agent:

| | | |
|---|---|---|
| Tensile strength, kg./sq. cm | 153 | 121 |
| Elongation, percent | 497 | 453 |
| Young's modulus at 300%, kg./sq. cm | 63 | 63 |
| Tear resistance, kg./cm | 8.4 | 5.5 |
| Cut growth resistance, kg./cm | 40 | 22 |
| Shore hardness | 55 | 55 |
| Shock elasticity, percent | 68 | 66 |

Example 6

A rubber compound was prepared from:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Paraffin fatty alcohol polyglycol ether with 20 mols ethylene oxide synthetized by reacting the fatty alcohols obtained by reduction of fatty acids produced by oxidation of paraffin, and containing 15–20 carbon atoms per molecule, with 20 mols ethylene oxide | 3.6 |

After vulcanization at 45 p. s. i. gauge pressure for 30 minutes, the following test results were obtained, as compared with those of a vulcanizate produced without the addition agent:

| | | |
|---|---|---|
| Tensile strength, kg./sq. cm | 135 | 121 |
| Elongation, percent | 503 | 463 |
| Young's modulus at: | | |
| 300%, kg./sq. cm | 55 | 59 |
| 500%, kg./sq. cm | 132 | |
| Tear resistance, kg./cm | 14 | 5.8 |
| Cut growth resistance, kg./cm | 38 | 22 |
| Shore hardness | 57 | 56 |
| Shock elasticity, percent | 66 | 65 |

Similar results can be obtained by using the corresponding fatty acid polyglycol ester.

Example 7

A rubber compound was prepared from:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Alumina gel | 60 |
| Toluenesulfonic acid dodecyl ester | 3.6 |

After vulcanization at 45 p. s. i. gauge pressure for 10 minutes, the following test results were obtained, as compared with those of a vulcanizate prepared without the toluenesulfonic acid ester:

| | | |
|---|---|---|
| Tensile strength, kg./sq. cm | 228 | 187 |
| Elongation, percent | 560 | 527 |
| Young's modulus at: | | |
| 300%, kg./sq. cm | 78 | 70 |
| 500%, kg./sq. sm | 185 | 174 |
| Tear resistance, kg./cm | 29 | 17 |
| Cut growth resistance, kg./cm | 69 | 43 |
| Shore hardness | 58 | 55 |
| Shock elasticity, percent | 67 | 63 |

Example 8

This example illustrates the further improvement in mechanical properties of a rubber vulcanizate brought out by adding water to toluenesulfonic acid paraffin fatty alcohol ester when used as a dispersing agent. The formulation consisted of:

Crepe rubber _____ 100
Zinc oxide, active _____ 3
Sulfur _____ 3
Mercaptobenzothiazole disulfide _____ 1
Diphenyl-guanidine _____ 0.5
Alumina gel _____ 60

Vulcanizates were prepared at 45 p. s. i. gauge pressure in 10 minutes from the basic mixture (A); from the same mixture with the addition of 3.6 parts of toluenesulfonic acid paraffin fatty alcohol ester (B); and from the same mixture with the addition of 3.6 parts of an emulsion of toluenesulfonic acid paraffin fatty alcohol ester with 10% water (C). As to these three vulcanizates, the following test results were obtained:

| | A | B | C |
|---|---|---|---|
| Tensile strength, kg./sq. cm | 187 | 228 | 219 |
| Elongation, percent | 527 | 563 | 560 |
| Young's modulus: | | | |
| 300%, kg./sq. cm | 70 | 75 | 76 |
| 500%, kg./sq. cm | 174 | 189 | 180 |
| Tear strength, kg./cm | 17 | 28 | 31 |
| Cut growth resistance, kg./cm | 43 | 58 | 67 |
| Shore hardness | 55 | 56 | 56 |
| Shock elasticity, percent | 63 | 66 | 64 |

Example 9

From this example it will be seen that an appreciable improvement in the mechanical properties of rubber vulcanizates can be achieved even with the use of a 30% solution of the oxyethylation product of isooctylphenol. The formulation used consisted of:

Crepe rubber _____ 100
Zinc oxide, active _____ 3
Sulfur _____ 3
Mercaptobenzothiazole disulfide _____ 1
Diphenyl-guanidine _____ 0.5
Alumina gel _____ 60
Oxyethylation product of isooctylphenol 30% produced by reacting 1 mol isooctylphenol with 6–12 mols ethylene oxide _____ 3.6

After vulcanization at 45 p. s. i. gauge pressure for 10 minutes, the vulcanizate had the following physical properties, as compared with those of a vulcanizate prepared without the addition agent:

| | | |
|---|---|---|
| Tensile strength, kg./sq. cm | 219 | 187 |
| Elongation, percent | 570 | 527 |
| Young's modulus: | | |
| 300%, kg./sq. cm | 66 | 70 |
| 500%, kg./sq. cm | 167 | 174 |
| Tear resistance, kg./cm | 43 | 17 |
| Cut growth resistance, kg./cm | 53 | 43 |
| Shore hardness | 55 | 55 |
| Shock elasticity, percent | 60 | 63 |

Example 10

This example illustrates the influence of the degree of oxyethylation of an oxyethylated technical grade of laurylalcohol, which is used as a dispersing agent, on the physical properties of a rubber vulcanizate. A rubber compound was prepared from:

Crepe rubber _____ 100
Zinc oxide, active _____ 3
Sulfur _____ 3
Mercaptobenzothiazole disulfide _____ 1
Diphenyl-guanidine _____ 0.5
Alumina gel _____ 60

To the basic composition (A) were added, respectively, 3.6 parts of:

(B) Lauryl alcohol, oxyethylated with 6 mols of ethylene oxide, $C_2H_4O$
(C) Lauryl alcohol, oxyethylated with 12 mols $C_2H_4O$
(D) Lauryl alcohol, oxyethylated with 18 mols $C_2H_4O$
(E) Lauryl alcohol, oxyethylated with 24 mols $C_2H_4O$ The same technical grade of lauryl alcohol was used in all four cases. After vulcanization at 45 p. s. i. gauge pressure for 60 minutes, the following physical properties of A to E were determined by test:

| | A | B | C | D | E |
|---|---|---|---|---|---|
| Tensile strength, kg./sq. cm | 180 | 203 | 198 | 217 | 207 |
| Elongation, percent | 577 | 547 | 550 | 580 | 553 |
| Young's modulus: | | | | | |
| 300%, kg./sq. cm | 56 | 71 | 70 | 71 | 78 |
| 500%, kg./sq. cm | 132 | 175 | 167 | 167 | 175 |
| Tear resistance, kg./cm | 11 | 35 | 38 | 42 | 43 |
| Cut growth resistance, kg./cm | 48 | 71 | 65 | 70 | 66 |
| Shore hardness | 56 | 60 | 61 | 63 | 62 |
| Shock elasticity, percent | 57 | 54 | 52 | 50 | 51 |

Example 11

This example illustrates the influence of a paraffin fatty alcohol, oxyethylated with 25 mols of ethylene oxide, on the mechanical properties of a rubber vulcanizate. The compound was made up from:

Crepe rubber _____ 100
Zinc oxide, active _____ 3
Sulfur _____ 3
Mercaptobenzothiazole disulfide _____ 1
Diphenyl-guanidine _____ 0.5
Alumina gel _____ 60
Paraffin fatty alcohol oxyethylated with 25 mols of ethylene oxide _____ 10.8

After vulcanization at 45 p. s. i. gauge pressure for 60 minutes, the vulcanizate gave the following test results, as compared with those of a vulcanizate prepared without the addition agent:

| | | |
|---|---|---|
| Tensile strength, kg./sq. cm | 195 | 180 |
| Elongation, percent | 607 | 577 |
| Young's modulus at: | | |
| 300%, kg./sq. cm | 34 | 56 |
| 500%, kg./sq. cm | 132 | 132 |
| Tear resistance, kg./cm | 38 | 11 |
| Cut growth resistance, kg./cm | 57 | 58 |
| Shore hardness | 55 | 56 |
| Shock elasticity, percent | 52 | 57 |

Example 12

This example shows that the dispersing agent of Example 11 improves the physical properties of a rubber vulcanizate even when used in form of a 10% aqueous emulsion. The following formulation was used:

Crepe rubber _____ 100
Zinc oxide, active _____ 3
Sulfur _____ 3
Mercaptobenzothiazole disulfide _____ 1
Diphenyl-guanidine _____ 0.5
Aluminum gel _____ 60
Paraffin fatty alcohol, oxyethylated with 25 mols ethylene oxide, in 10% emulsion _____ 3.6

After vulcanization at 45 p. s. i. gauge pressure for 20 minutes, the following test results were obtained, as compared with those of a vulcanizate prepared without the addition agent:

| | | |
|---|---|---|
| Tensile strength, kg./sq. cm | 167 | 178 |
| Elongation, percent | 470 | 517 |
| Young's modulus at: | | |
| 300%, kg./sq. cm | 75 | 68 |
| 500%, kg./sq. cm | | 167 |
| Tear resistance, kg./cm | 18 | 16 |
| Cut growth resistance, kg./cm | 54 | 50 |
| Shore hardness | 58 | 55 |
| Shock elasticity, percent | 64 | 62 |

Example 13

This example, which uses aluminum silicate as a filler, illustrates the importance of correct proportioning the dispersing agent to achieve optimum results as to tear resistance, etc. The rubber compound used in the experiment consisted of the following basic formulation (A):

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Aluminum silicate | 60 |

Identical compositions were prepared except for the addition of, respectively, (B) 3.6 parts of lauryl-polyglycol ether (degree of polymerization 24) and (C) 10 parts of laurylpolyglycol ether. After curing at 45 p. s. i. gauge pressure for 20 minutes, the following test data were obtained with the three vulcanizates:

| | A | B | C |
|---|---|---|---|
| Tensile strength, kg./sq. cm | 66 | 75 | 170 |
| Elongation, percent | 360 | 320 | 490 |
| Young's modulus at 300%, kg./sq. cm | 52 | 64 | 80 |
| Tear resistance, kg./cm | 3.7 | 4 | 27 |
| Cut growth resistance, kg./cm | 12 | 14 | 40 |
| Shore hardness | 52 | 58 | 60 |
| Shock elasticity, percent | 50 | 48 | 48 |

With a lauryl-polyglycol ether content of 3.6% relative to rubber, no significant improvement of the mechanical properties, especially tear resistance, occurs. With a higher proportion (10%) of the dispersing agent in the same test composition, the tear resistance was improved about sevenfold, as compared to the tear resistance of the composition containing no dispersing agent. The tensile strength was doubled, and the cut growth resistance was increased in a similar proportion.

Example 14

This example shows the substantial improvement in mechanical properties achieved with calcium silicate as a filler when used with the addition agents of the invention. The following formulation was used:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Calcium silicate | 60 |
| Lauryl-polyglycol ether (degree of polymerization 24) | 3.6 |

After vulcanization at 45 p. s. i. gauge pressure for 10 minutes, the vulcanizate had the following physical properties, as compared to those of a vulcanizate prepared without the lauryl-polyglycol ether:

| | | |
|---|---|---|
| Tensile strength, kg./sq. cm | 217 | 89 |
| Elongation, percent | 517 | 430 |
| Young's modulus at: | | |
| 300%, kg./sq. cm | 89 | 46 |
| 500%, kg./sq. cm | 207 | |
| Tear resistance, kg./cm | 38 | 3 |
| Cut growth resistance, kg./cm | 57 | 9 |
| Shore hardness | 61 | 46 |
| Shock elasticity, percent | 59 | 52 |

Due to the addition of the dispersing agent, the tear strength is increased in this instance twelvefold. The tensile strength is tripled, and the cut growth resistance is increased six times.

Example 15

This example demonstrates the improvement in tear resistance and in physical characteristics of a rubber composition containing a pyrogen silica filler when lauryl-polyglycol ether of a degree of polymerization of 18 is added. The following formulation was used:

| | |
|---|---|
| Crepe rubber | 100 |
| Zinc oxide, active | 3 |
| Sulfur | 3 |
| Mercaptobenzothiazole disulfide | 1 |
| Diphenyl-guanidine | 0.5 |
| Pyrogen silica | 75 |
| Lauryl-polyglycol ether (degree of polymerization 18) | 10 |

After vulcanization at 45 p. s. i. gauge pressure for 60 minutes, the following test results were obtained, as compared with those given by the same composition but without the dispersing agent:

| | | |
|---|---|---|
| Tensile strength, kg./sq. cm | 178 | |
| Elongation, percent | 637 | |
| Young's modulus at: | | |
| 300%, kg./sq. cm | 52 | |
| 500%, kg./sq. cm | 114 | |
| Tear resistance, kg./cm | 72 | 50 |
| Cut growth resistance, kg./cm | | 58 |
| Shore hardness | 85 | 91 |
| Shock elasticity, percent | 36 | 33 |

The vulcanizate prepared without the dispersing agent had the characteristics of tough leather or of a wooden board. Only the vulcanizate made with addition of the dispersing agent had rubberlike characteristics.

It will be apparent that while we have described our invention in preferred forms, many changes and modifications may be made without departing from the spirit of the invention defined in the following claims.

We claim:

1. In the process according to claim 5, admixing paraffin fatty alcohol-polyethylene glycol ethers to serve as said polyethylene glycol ethers of aliphatic alcohols, the former being obtained by reduction of fatty acids produced by oxidation of paraffin, and containing 15 to 20 carbon atoms per molecule.

2. In the process according to claim 5, admixing polyethylene glycol ethers of lauryl alcohol to serve as said polyethylene glycol ethers of aliphatic alcohols.

3. In the process according to claim 5, admixing butyl-phenol-polyethylene glycol ethers to serve as said polyethylene glycol ethers of alkylated phenols.

4. In the process according to claim 3, admixing butyl-phenol-polyethylene glycol ethers synthetized by oxyethylation of 1 mol butylphenol with a multiple number of mols of ethylene oxide.

5. Process for the manufacturing of rubber vulcanizates, comprising compounding natural rubber, light-colored hydrophilic fillers, and addition agents selected from the group consisting of polyethylene glycol ethers of aliphatic monohydric alcohols having 12 to 20 carbon atoms, polyethylene glycol ethers of alkylated phenols, hexyl-heptyl-naphthol-polyethylene glycol ethers, and mixtures thereof, said light-colored hydrophilic fillers being selected from the group consisting of alumina gel, aluminum silicate, calcium silicate, pyrogenic silica, and mixtures thereof.

References Cited in the file of this patent

UNITED STATES PATENTS

| | | |
|---|---|---|
| 2,099,651 | Helft | Nov. 16, 1937 |
| 2,118,506 | Graves | May 24, 1938 |
| 2,343,091 | Smith | Feb. 29, 1944 |
| 2,354,424 | Novotny et al. | July 25, 1944 |
| 2,360,895 | Sarbach | Oct. 24, 1944 |
| 2,381,388 | Tann | Aug. 7, 1945 |
| 2,386,764 | Zwicker | Oct. 16, 1945 |
| 2,419,512 | Vesce | Apr. 22, 1947 |